United States Patent [19]

Leopold, Jr. et al.

[11] 3,924,877
[45] Dec. 9, 1975

[54] STAB-TYPE COUPLING JOINT

[75] Inventors: Wilbur R. Leopold, Jr., Decatur, Ill.; Frank C. Hackman, Albertville, Ala.; Lawrence F. Luckenbill; Daniel A. Ellis, both of Decatur, Ill.

[73] Assignee: Mueller Co., Decatur, Ill.

[22] Filed: Sept. 9, 1974

[21] Appl. No.: 504,249

[52] U.S. Cl. ................................ 285/340; 285/369
[51] Int. Cl.² ........................................ F16L 21/02
[58] Field of Search ........... 285/340, 369, 383, 374, 285/351, 348

[56] References Cited
UNITED STATES PATENTS

| | | | |
|---|---|---|---|
| 2,184,376 | 12/1939 | Beyer et al. | 285/383 X |
| 2,491,004 | 12/1949 | Graham | 285/105 |
| 2,999,701 | 9/1961 | Blair et al. | 285/348 X |
| 3,204,988 | 9/1965 | Ouderkirk et al. | 285/40 |

*Primary Examiner*—Andrew V. Kundrat
*Attorney, Agent, or Firm*—Cushman, Darby & Cushman

[57] ABSTRACT

A stab-type coupling joint for connecting an end portion of a smooth wall pipe or tube to fittings or other pipes. The stab-type coupling joint includes a hollow body member or sleeve member made from steel, the sleeve member being rolled at least at one end and at a point spaced from the end for retaining pipe gripping and sealing means such as a solid annular backup insert ring, a solid annular finger pipe gripper washer, a rigid annular washer, and a second insert ring with sealing rings in series and the sleeve member further including stop means spaced inwardly from the pipe receiving aperture of the same to prevent over-insertion of the pipe through the annular finger pipe gripper washer. Suitable sealing means are provided between the exterior of the pipe and the second insert ring, as well as between the interior of the sleeve member and the second insert means, these sealing means being positioned outwardly of the annular finger pipe gripper washer whereby ground fluids are sealed out, the length of insertion of the pipe is reduced, and the sealing means between the pipe and the second insert do not have to seal across scratches on the exterior of the pipe. The sleeve member may have identical end portions with mirror-image or reversed pipe gripper and sealing means therein whereby pipes may be stabbed from opposite ends of the sleeve member or the sleeve member may have one end for connection to a fitting or to another pipe by means of welds, threads, or the like.

23 Claims, 8 Drawing Figures

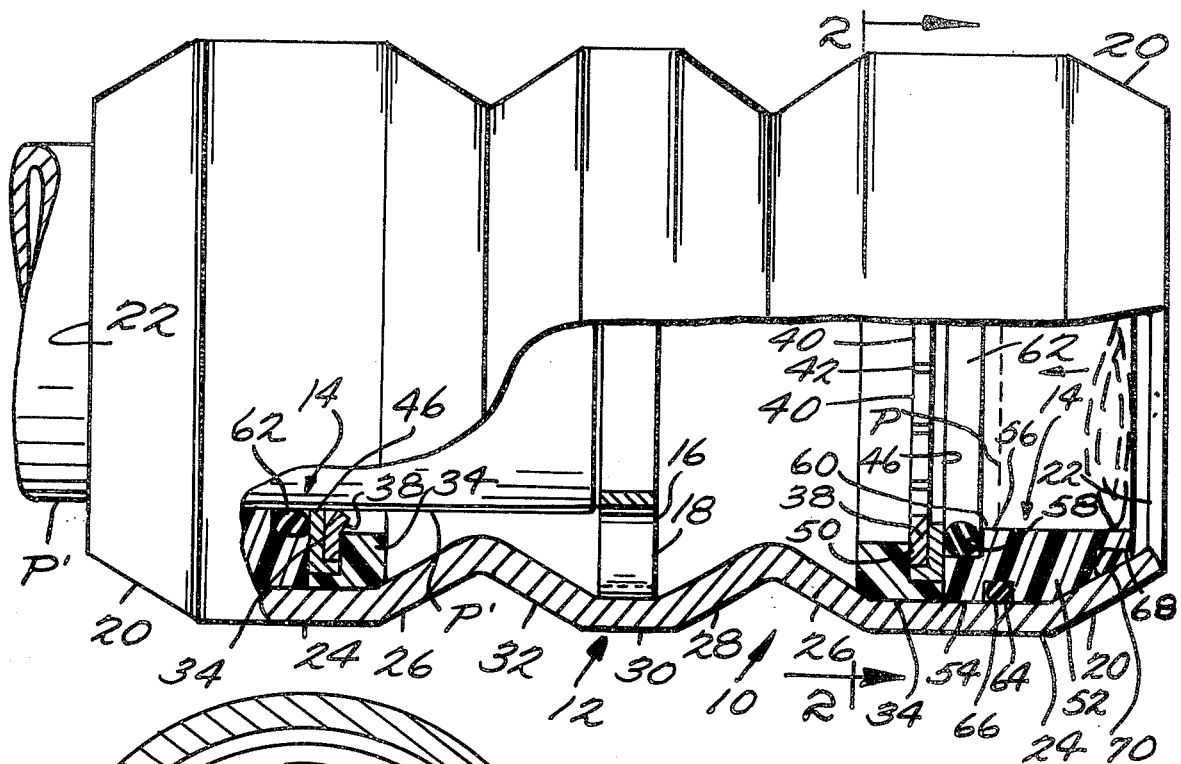
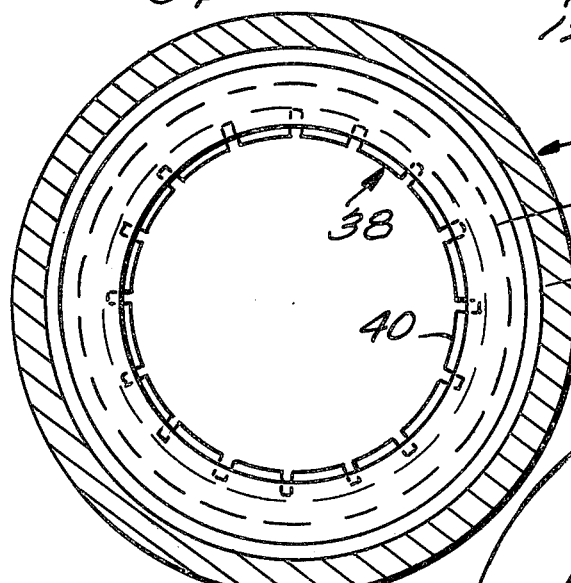
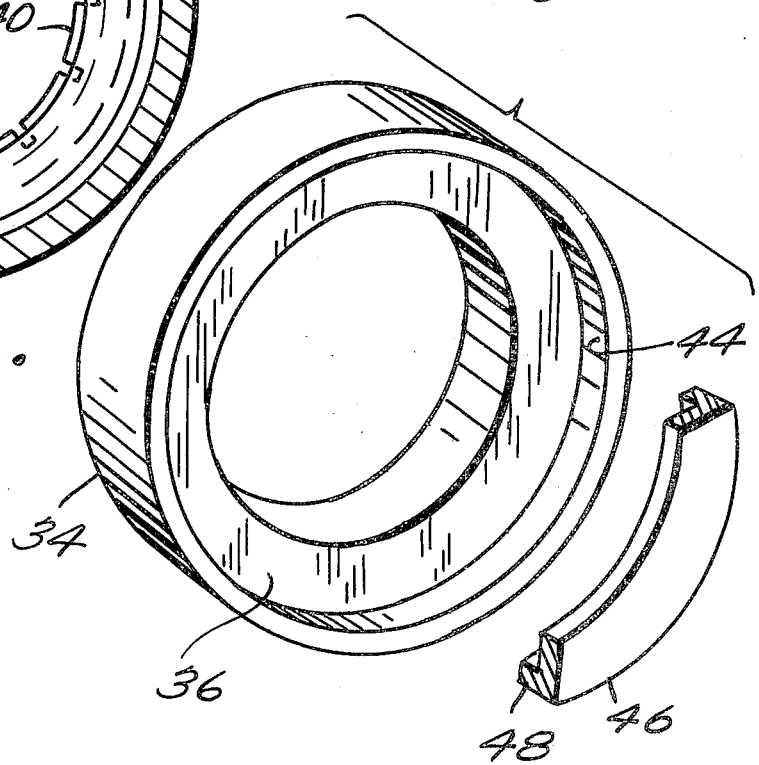
Fig. 1.
Fig. 2.
Fig. 3.

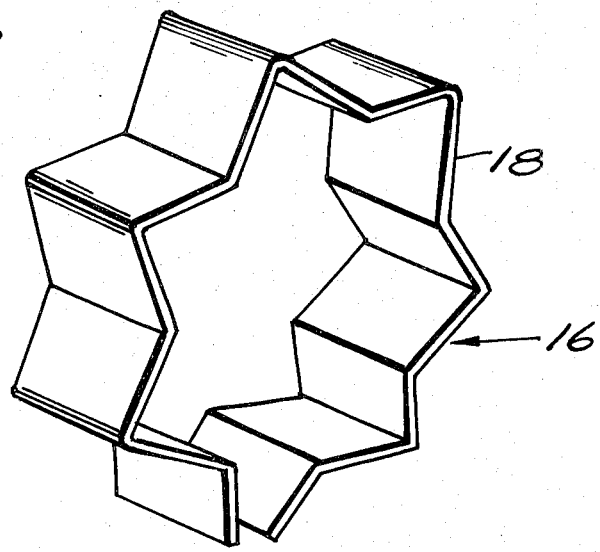
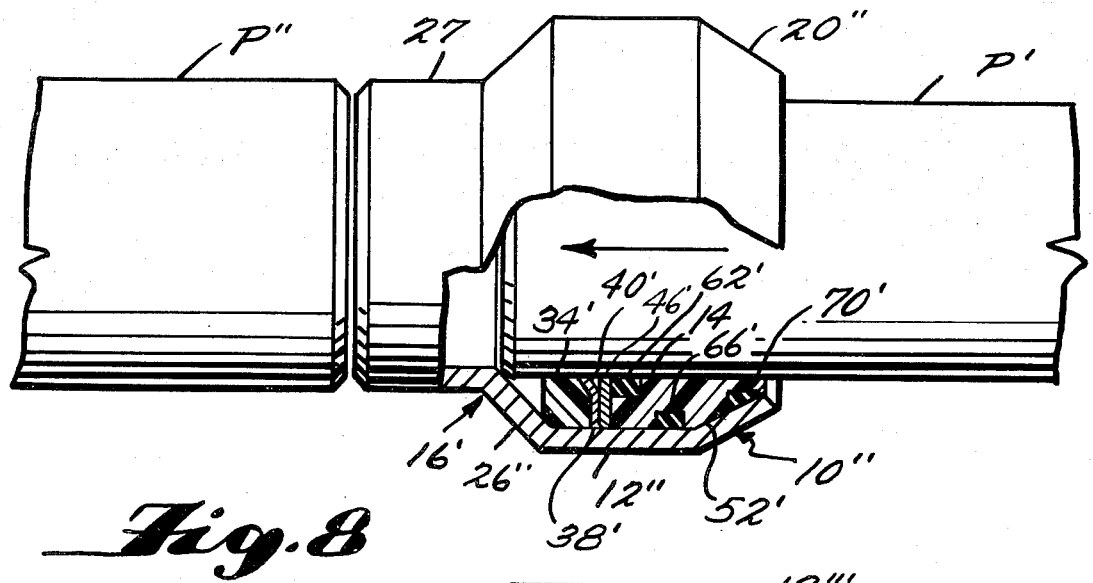
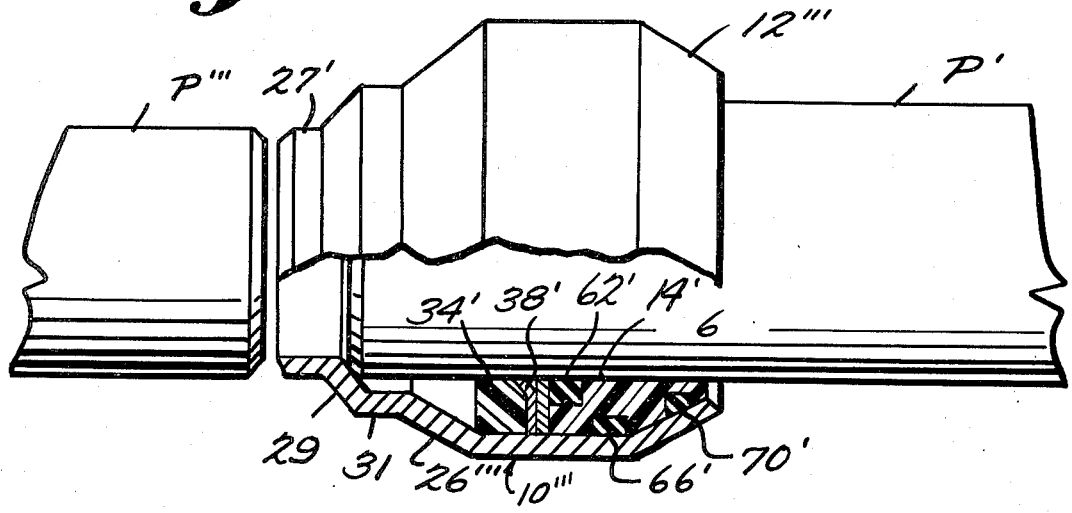

STAB-TYPE COUPLING JOINT

The present invention relates to an improvement in stab-type coupling joints for smooth wall pipes, the joint having a design which is particularly adaptable for varying the different parameters of the component parts to meet different criteria needed for different types of pipes with respect to characteristics such as pull-out resistance, installation load, and initial and final grip of the pipe. The joint may be used for steel pipes, copper pipes, plastic pipes, and the like and is particularly suitable for large diameter pipes.

BACKGROUND OF THE INVENTION

Heretofore, many efforts have been made to manufacture stab-type coupling joints for connecting an end portion of a smooth wall or flareless pipes or tubes to fittings or other pipes for fluid distribution systems such as gas and water. The design of the stab-type coupling joint was usually controlled by the type of pipe with which the joint was to be used. For example, such prior stab-type coupling joints have used gripper rings, both solid and the split type, but there was no flexibility in the design of the component parts to allow for the same general design to be used for different types of pipe with respect to the capability of the joint meeting a desired criteria such as pull-out resistance, installation load, initial and final grip. The prior art designs utilized "Bellville" springs which were frusto-conical locking rings, such locking rings having to be flattened to a planar condition so as to reduce the interior diameter of the same to grip the pipe. Other prior configurations utilized split gripper rings and had to be cammed to contract about the pipe in order to grip the pipe when an outward load was applied to the same. In some other constructions, gripper washers, which were either solid or split and which had radially inwardly extending teeth, were used, but in these situations, the design of the coupling joint and the manufacture of the same were quite complicated. Additionally, the pipe, once it was stabbed into the coupling joint, many times could not be rotated. In other instances, additional gripper means was utilized with the finger gripper washer to assist in gripping the pipe and, oftentimes, this additional means was the gasket seal ring, thus, resulting in an unnecessary load on the gasket whereby there was the possiblity of the gasket having cold flow so that ultimately it lost its sealing function.

By far, the greatest problem with the prior art stab-type coupling joints was the complexity of design which required considerable machining of the body member and complicated assembly procedure.

With the foregoing in mind, it is an object of the present invention to provide a stab-type coupling joint capable of easy and inexpensive manufacture, the joint being of such a character that individual components can be varied, depending upon desired characteristics required of the joint. The joint of the present invention is particularly adapted for use with large diameter pipes, regardless of whether the pipe is made of copper, steel, plastic, or the like.

PRIOR ART

Prior art relating to stab-type coupling joints for flareless smooth end pipes are as follows:

| Number | Name | Date |
| --- | --- | --- |
| 1,081,702 | Clayton | Aug. 31, 1967 |
| 2,491,004 | Graham | Dec. 13, 1949 |
| 2,950,132 | Kocsuta | Aug. 23, 1960 |
| 3,204,988 | Ouderkirk et al | Sept. 7, 1965 |
| 3,365,219 | Nicolaus | Jan. 23, 1968 |

BRIEF SUMMARY OF THE INVENTION

Broadly stated, the present invention contemplates an improvement in a stab-type coupling joint which is utilized for connecting an end portion of a smooth wall pipe to fittings or other pipes and it comprises a sleeve member having a substantially uniform wall thickness, the sleeve member having one frusto-conical end portion terminating at its smallest end in a pipe receiving aperture, the sleeve member further having a cylindrical portion adjacent to and merging with the larger end of the frusto-conical end portion with the cylindrical portion in turn merging with a second frusto-conical portion that tapers inwardly from the other end of the cylindrical portion. Stop means are provided within the sleeve member and are spaced inwardly from the pipe receiving aperture to prevent over-insertion of the pipe through the pipe receiving aperture. The frusto-conical end portion, cylindrical portion, and second frusto-conical end portion of the sleeve member define an annular interior space within the sleeve member for accurately positioning and retaining the pipe gripper and sealing means which comprise an annular backup insert ring, an annular finger pipe gripper washer, a rigid annular washer, and a second annular insert ring, all in series, the second annular insert ring carrying a sealing ring on its interior for sealing engagement with the exterior of the pipe and at least one sealing ring on its exterior for sealing engagement with the interior of the sleeve member. Stop means are positioned within the sleeve member inwardly of the pipe gripper and sealing means to prevent over-insertion of the pipe.

The sleeve member is preferably made of steel and when it is in its cylindrical shape, the gripper and sealing means are inserted onto a mandrel and accurately positioned within the sleeve member and then the frusto-conical end portion and the second frusto-conical portion are formed to properly axially position and retain the gripper and sealing means within the sleeve member. The annular backup insert ring and the second insert ring are solid and preferably made of plastic, whereas the rigid annular washer, which provides a thrust ring to back up the gripper ring, is also solid and made of steel. The gripper ring, which is a solid flat washer-like ring, is provided with radially inwardly extending fingers that have sufficient flexibility when the pipe is stabbed into the joint to flare inwardly of the sleeve member along the pipe and dig into the walls of the pipe when the pipe tries to move outwardly of the joint. The annular finger pipe gripper washer is preferably made of steel, but can be made of other material so long as the material is a harder material than that of the pipe being inserted.

The control of the thickness of the annular finger pipe gripper washer, as well as the control of the length of the slots between the fingers of the washer, influence the performance of the coupling joint for a pipe of a particular outside diameter and/or material. As will now be understood, the control of these dimensions will be determined depending upon the pull-out resistance desired and installation load on stabbing. Additionally, the design of the stab-type coupling joint, with all of the components of the gripper means being annular and solid, the joint has considerably more rigidity than those of the split gripper ring type and, consequently, the sealing means for the gripper means may be of the O-ring type since they do not have to assume any of the pull-out load. The sealing rings are provided closer to the pipe receiving aperture of the sleeve member than the annular finger pipe gripper washer and, thus, they do not engage any score marks on the pipe caused by the finger washer ring. Sealing rings are provided between the exterior of the outermost backup insert to seal with the interior of the sleeve member and, thus, prevent ingress of ground fluids which could cause corrosion if any of the components of the gripper means are made of steel. On the other hand, these latter-mentioned sealing rings also prevent leakage of interior fluid to the outside of the coupling joint between the sleeve member and the components of the gripper means.

While the stab-type coupling joint in its broadest sense need have only gripper and sealing means at one end portion of the sleeve member for stabbing a pipe therein with the other end portion being connected to another pipe or fitting such as a valve or tee by welding or threading, the coupling joint can also be so designed as to have gripper and sealing means at opposite ends of the sleeve member so that pipes may be stabbed from both ends of the coupling joint. Of course, the end portions of the sleeve member and the two gripper and sealing means would be reversed or mirror-image arrangements of one another and in this type of coupling joint, the stop means would be positioned intermediate the two gripper and sealing means so that it functions as a stop for both pipe sections.

DESCRIPTION OF THE DRAWINGS

FIG. 1 is a side elevational view of the stab-type coupling joint of the present invention having a portion of the same broken away in vertical section, the view illustrating the pipe at the left hand side of the drawing fully inserted with the pipe at the right hand side of the drawing being inserted.

FIG. 2 is a cross-sectional view taken on the line 2—2 of FIG. 1.

FIG. 3 is an exploded perspective view illustrating the annular backup ring of FIG. 1 with a fragment of the rigid annular washer of FIG. 1.

FIG. 6 is a perspective view of the stop means shown in FIG. 1 or FIG. 4.

FIG. 7 is a further modification of the coupling joint of the present invention, the view being a side elevational view partly broken away in vertical section and illustrating the stop means when formed as an integral part of the sleeve member.

FIG. 8 is a still further modification of the coupling joint of the present invention and is similar to FIG. 7, but illustrating a coupling joint wherein the stop means is positioned further away from the pipe receiving aperture of the sleeve member so that the pipe can be stabbed further into the sleeve member.

DETAILED DESCRIPTION OF THE DRAWINGS

Figure 4:
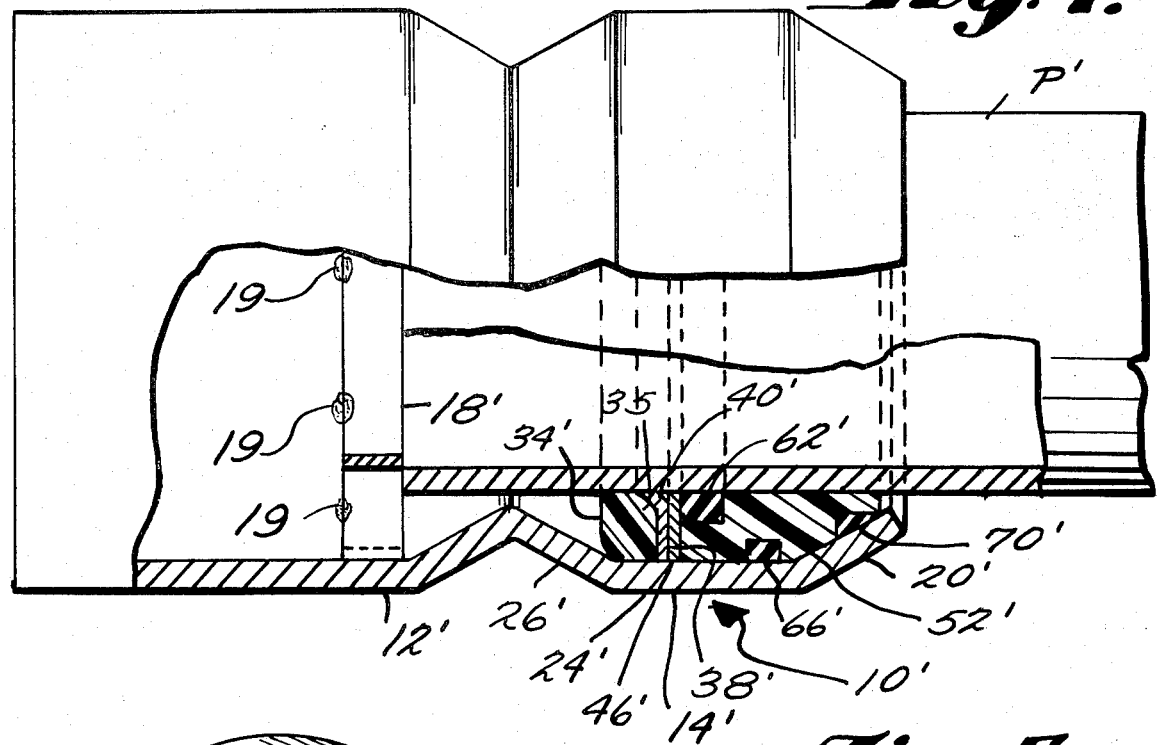
FIG. 4 is a side elevational view of a modified form of the present invention, the view having a portion broken away and shown in vertical section.

Referring now to the drawings wherein like characters or reference numerals represent like or similar parts, there is disclosed in FIG. 1 a stab-type coupling joint of the present invention generally designated at 10. The joint shown in FIG. 1 is of the type for coupling two smooth wall pipes P and P' to each other, the coupling of each pipe P and P' being accomplished by a stabbing action. The pipes P and P' may be made from metal such as copper, steel, or iron, or they may be made from a plastic material such as polyethylene (PE), polyvinyl chloride (PVC), polybutylene (PB), or the like.

Broadly, the joint 10 includes a tubular sleeve member 12 having a uniform wall thickness throughout its length. The sleeve member 12 is formed from a cylindrical tubular element and is uniquely shaped, as will be described later in the specification. Each end of the sleeve member 12 carries a gripper and sealing means, generally designated at 14, each gripper and sealing means 14 having identical component elements, but with the elements reversed as will be appreciated by those skilled in the art. Intermediate the sealing means, there is provided a stop means 16 which may be in the form of an undulated spring ring 18, as shown in FIG. 6. The ring is undulated when viewed in an axial direction, but it may take other shapes so long as the circumscribed outside diameter of the ring 18 is approximately that of the inside diameter of the sleeve member and so long as the circumscribed inside diameter of the ring is smaller than the outside diameter of the pipes P and P'. One advantage of the undulated shape of the stop ring 18 is that it provides less obstruction to the flow of fluid through the passageway of the joint. While the stop ring 18 is shown as a split ring, it may be endless or solid and this can be accomplished by welding the ends shown or producing the same from a seamless tube or extrusion. As will be appreciated in viewing FIG. 1, the shape of the sleeve member 12 is such that it retains both the gripper and sealing means 14 in a predetermined axial position, as well as retains the stop means 16 in a proper axial position. However, while FIG. 1 shows the stop ring 18 held in position by the shape of the sleeve member, it will be appreciated that the stop ring could be held in position by spot welds or the like, such as shown in FIG. 4.

In more detail, the sleeve member 12 is made from a steel cylindrical body and is rolled to the shape disclosed after the gripper and sealing means 14 have been properly positioned in the cylindrical body and after the stop means 16 has been positioned intermediate the ends of the cylindrical body. The gripper and sealing means 14 are held in their position by a mandrel (not shown) and then the cylindrical steel body is rolled to the shape of the sleeve member. In this respect, it will be understood that one gripper and sealing means 14 is placed on one mandrel and inserted into the cylindrical body from one end with the mandrel controlling the positioning of the gripper and sealing means, as well as the end of the mandrel controlling the position of the stop means. Either simultaneously with this operation or in sequence therewith, a second mandrel may be inserted from the other end of the cylindrical body, the second mandrel positioning the other gripper and sealing means 14 with the other end when the cylindrical steel body is rolled into shape the sleeve member 12. After the rolling operation, the mandrels are removed and the joint 10 is ready for use. Rolling of the sleeve member 12 to shape may be accomplished by any suitable rolling apparatus.

To describe the final shape of the sleeve member, the shape will be described from the right hand of FIG. 1 toward the left. In this respect, the final shape of the sleeve member includes a frusto-conical end portion 20 terminating in a pipe receiving aperture 22, a cylindrical portion 24 adjacent to and merging with the larger end of the frusto-conical end portion 20, a second inwardly tapering frusto-conical portion 26 merging with the other end of the cylindrical portion 24, and a third frusto-conical portion 28 merging with the smaller end of the second frusto-conical portion 26 and tapering outwardly therefrom and merging at its larger end with a cylindrical portion 30 which, in turn, merges with an inwardly tapering fourth frusto-conical portion 32. Continuing to the left of FIG. 1, the other end portion of the sleeve member 12 is substantially identically shaped to that just described, but is the reverse or mirror-image of the same and, consequently, similar numerals will be given for similar components of the joint 10. It will be noted from FIG. 1 that the gripper and sealing means 14 is axially entrapped between the first and second frusto-conical portions 20 and 26. On the other hand, the stop ring 18 is axially entrapped between the frusto-conical portions 28 and 32.

The component elements of the gripper and sealing means 14 will now be described. First, there is provided an annular backup insert ring 34 which is L-shaped in cross section and which has an outside diameter substantially equal to the inside diameter of the cylindrical portion 24 of the sleeve member 12. The interior diameter of the annular backup insert ring 34 is greater than the outside diameter of the pipe P so that the pipe may easily pass therethrough. FIG. 3 discloses in perspective the annular backup insert ring 34 and it will be noted that because of its L-shaped cross section, it has an axial projecting flange or leg 44 which encircles an outwardly facing shoulder 36. The annular backup insert ring 34 is solid or endless as opposed to being split and is made of a substantially rigid plastic material such as polyethylene (PE), polyvinyl chloride (PVC), polybutylene (PB), or the like. It, of course, could be made of metal if so desired. An annular finger pipe gripper washer 38, having radially inwardly extending gripper fingers 40 (FIG. 2) separated by slots 42, has an outside diameter less than the inside diameter of the flange or leg 44 of the L-shaped annular backup insert ring 34 with the fingers 40 having a circumscribed inside diameter slightly less than the outside diameter of the pipe P. The pipe gripper washer 38 is flat and it, too, has a solid or endless shape about its periphery rather than being split. The fingers 40 have sufficient flexibility to flex inwardly when they are engaged by the end of the pipe P being stabbed into the joint so that they can ride along the wall of the pipe P, but since the pipe gripper washer 38 is made from a material harder than the material of the pipe P, they will dig into the wall of the pipe P when there is outward pull on the pipe P. A rigid annular thrust washer 46, preferably made of steel, is L-shaped in radial section and is provided with a peripheral leg or flange 48 which fits into the leg 44 of the annular backup insert ring 34 and abuts the shoulder 36. The steel washer 46 is endless and it has an exterior diameter equal to or slightly less than the interior diameter of the shoulder 36 and it has an interior diameter greater than the outside diameter of the pipe P so that the pipe P can easily pass therethrough. From FIG. 1, it will be noted that the washer 46 defines two walls of a groove 50 formed between the backup insert ring 34 and the washer 46, the groove 50 receiving the outer periphery portion of the gripper washer 38. As will now be understood, once the pipe P has been stabbed into the sleeve member, an outward pull on the pipe P creates an outward thrust which is absorbed by the rigid annular thrust washer 46. When referring to the components of the gripper and sealing means 14 in a direction toward the pipe receiving aperture 22, the outermost component is a second annular insert ring 52 which is substantially rigid and which is solid or endless. The second insert ring 52 may be made from a plastic material such as polyethylene (PE), polyvinyl chloride (PVC), polybutylene (PB), or the like, or it may be made from metal. The annular insert ring 52 has an inside diameter greater than the diameter of the pipe P so that it can easily receive the pipe P and has an exterior surface 54 which is complementary to the interior surface of the frustoconical end portion 20 and at least a portion of the interior surface of the cylindrical portion 24 of the sleeve member 12. Additionally, it will be noted that a bore 56 defining the inner diameter of the ring 52 is provided with a counterbore 58 at its inner end and this counterbore defines an annular groove 60 with the steel washer 46, the groove receiving an elastomeric O-ring having an inside diameter less than the outside diameter of the pipe P'. The radial thickness of the O-ring 62 is slightly greater than the depth of the groove 60 so that when the pipe P' is inserted therethrough, the O-ring forms a tight seal between the exterior of the pipe P' and the surface of the bore 56. A second groove 64 is provided on the cylindrical portion of the surface 54 for receiving an O-ring 66, whereas a third groove 68 is provided on the leading edge of the frusto-conical portion of the surface 54 for an O-ring 70. When the sleeve member 12 is formed by rolling, the O-rings 66 and 70 are placed under compression and the O-ring 70 functions as a primary seal against the ingress of fluids of the exterior of the joint and the O-ring 66 functions as a secondary seal of the ingress of fluids from the exterior, whereas the reverse is true of the seals 66 and 70 with regard to preventing escape of fluid from within the joint 10.

Referring to the left side of FIG. 1, it will be noted that the pipe P' has been stabbed into the joint 10 and its end is stopped by the stop ring 18. The fingers 40 of the gripper ring 38 are flexed inwardly due to the stabbing action of the pipe P. The pipe P' on the right side of the figure is shown in broken lines and it is just being inserted through the pipe receiving aperture 22 and is about to be inserted through the O-ring 62 where the O-ring makes a seal between the exterior of the pipe P' and the second insert ring 52.

It will be appreciated that the flexibility of the fingers 40 can be controlled merely by changing the length of the fingers, widening, or narrowing the slots 42, as the case may be, or by making the gripper washer 38 thicker in an axial direction, or a combination of these variables. In some instances where large diameter pipes are mechanically inserted, the installation loads may not be too critical, but it may be desired to have higher pull-out loads and this can be done by decreasing the flexibility of the fingers 40, as referred to above. Of course, where installation load is critical, the dimensions of the fingers of the gripper ring and the slots must be so controlled as to provide for relative low installation load, but high pull-out resistance.

When the joint 10 has been made up between the two pipes P and P', it will be appreciated that the pipes may be rotated about their axes, even though they are restrained from movement axially of one or the other.

Figure 5:
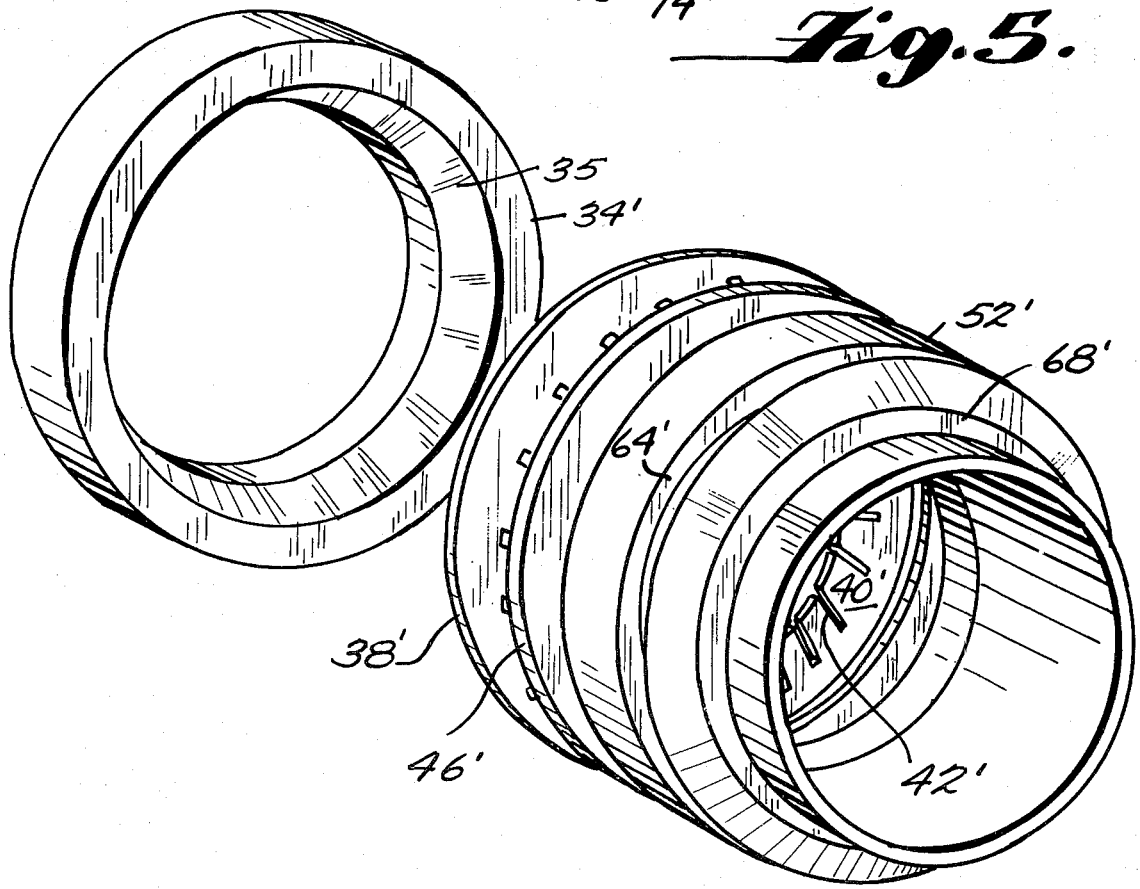
FIG. 5 is an exploded view of the gripper means of the modification shown in FIG. 4.

Referring now to FIGS. 4 and 5, there is disclosed a slight modification of the joint 10. The joint 10' of FIG. 4 is provided with a gripper and sealing means 14' entrapped in an annular space defined by the frusto-conical end portion 20', cylindrical portion 24', and the second frusto-conical portion 26' of sleeve member 12'. In this modification, the sleeve member does not have a second gripper and sealing means at the other end portion of the sleeve member 12' as this end portion is intended to be attached to a fitting such as a valve, tee, or the like or to another pipe by welding or the provision of threads. It will be noted that in this arrangement of joint 10', the pipe stop ring 18' is substantially identical to the stop ring 18, but it is retained in position by spot welds 19 prior to the forming of the end portion of the sleeve member which entraps the gripper and sealing means 14'.

The gripper and sealing means 14' differs slightly from that disclosed in FIG. 1 in that the backup insert ring 34 is provided with an outwardly flaring bevel 35 from its bore for the purpose of receiving the deflected fingers 40' of the gripper ring 38'. Additionally, the gripper ring 38' has an outside diameter substantially equal to the inside diameter of the cylindrical portion 24' and, consequently, it is not necessary to make the insert ring 34' L-shaped in cross section. The rigid thrust washer 46' also is not L-shaped since its outside diameter is substantially equal to or slightly less than the inside diameter of the cylindrical portion 24'.

The second insert ring 52' is substantially identical to the insert ring 52 of FIG. 1 with regard to its configuration and, consequently, a description will not be repeated. However, numerals with primes are applied to FIGS. 4 and 5 for the second insert ring 52' to identify the sealing rings and the grooves for receiving the sealing rings.

FIGS. 7 and 8 show slight modifications to the modification shown in FIG. 4 with regard to forming a stop means 16' integrally in the sleeve members 12" and 12''' to control the insertion of the pipe P' therein. In FIG. 7, the sleeve member 12" is provided with a second frusto-conical wall 26" which merges into a cylindrical end portion 27 at its other end. It should be noted that the wall 26" is formed by rolling so that the interior diameter of the end portion 27 is less than the diameter of the pipe P' and, consequently, the frusto-conical wall 26" acts as a stop for the pipe P' when the joint 10" is made up.

FIG. 8 shows a slightly modified form of sleeve member 12''' wherein the sleeve member is designed to be able to have the pipe P' inserted therein further than in the modification of FIG. 7. In this respect, a third frusto-conical wall 29 is provided and it merges into a cylindrical portion 31 which terminates at the smaller end of the second frustoconical wall 26'''. Both the sleeve members 12" and 12''' are capable of being welded at their end portions 27 and 27', respectively, to the pipes P" and P'''. The pipe gripper and sealing means of the two joints 10" and 10''' are shown as identical to the pipe gripper and sealing means 14' of FIG. 4 and the components thereof are, thus, given the same numerals. However, it will be appreciated by those skilled in the art that the pipe gripper and sealing means 14' of the joints of FIGS. 7 and 8 could be identical to the pipe gripper and sealing means 14 of the joint 10 of FIG. 1.

The terminology used in this specification is for the purpose of description and not limitation as the scope of the invention is defined in the claims.

What is claimed is:

1. A stab-type coupling joint for connecting an end portion of a smooth wall pipe to fittings or other pipes comprising:

a sleeve member having a substantially uniform wall thickness, said sleeve member having at least one frusto-conical end portion terminating in a pipe receiving aperture, a cylindrical portion adjacent to and merging with the larger end of said frusto-conical end portion and a second frusto-conical portion tapering inwardly from the other end of said cylindrical portion;

stop means spaced inwardly away from said pipe receiving aperture and inwardly of the other end of said cylindrical portion to prevent over-insertion of the pipe through said pipe receiving aperture;

said one frusto-conical end portion, said cylindrical portion, and said second frusto-conical portion defining an annular interior space in said sleeve member;

an annular backup insert ring, an annular finger pipe gripper washer having radially inwardly extending gripper fingers, a rigid annular washer, and a second insert ring in series and positioned in said annular interior space and retained between said second frusto-conical portion and said frusto-conical end portion, respectively, said second annular insert ring having an exterior configuration substantially complementary to a portion of said cylindrical portion and said frusto-conical end portion;

and at least one sealing ring carried by said second insert ring on the interior surface of the same for sealing with the exterior of the pipe and at least one sealing ring carried on the exterior of said second insert ring for sealing with the interior of said sleeve member.

2. A stab-type coupling joint as claimed in claim 1 in which said sleeve member is made of steel and in which said frusto-conical end portion and said second frusto-conical portion are rolled with said annular backup ring, said annular finger pipe gripper washer, said rigid annular washer, and said second insert ring being preliminarily positioned within the sleeve member.

3. A stab-type coupling joint as claimed in claim 2 in which said backup insert ring and said second insert ring are made of a substantially rigid plastic material and in which said rigid annular washer is steel.

4. A stab-type coupling joint as claimed in claim 2 in which said second frusto-conical portion of said sleeve member is so rolled as to have an interior diameter less than the exterior diameter of the pipe and thereby functioning as said stop means.

5. A stab-type coupling joint as claimed in claim 1 in which said second insert ring is provided with a counterbore, said counterbore and said rigid annular washer defining a groove for the sealing ring on the interior surface of said second insert ring.

6. A stab-type coupling joint as claimed in claim 1 in which said backup insert ring has an exterior diameter substantially equal to the interior diameter of the cylindrical portion of said sleeve member and is provided with a counterbore whereby it is L-shaped in radial section, said counterbore defining with an axial inner end of said second insert ring, an annular groove for receiving said gripper washer, and said steel rigid annular washer.

7. A stab-type coupling joint as claimed in claim 6 in which said rigid annular washer is L-shaped in radial section and in which said gripper washer has its peripheral portion received between said rigid annular washer and said annular backup insert ring.

8. A stab-type coupling joint as claimed in claim 7 in which said second insert ring is provided with a counterbore, said counterbore and said rigid annular washer defining a groove for the sealing ring on the interior surface of said second insert ring and in which said second insert ring is provided with a groove on its exterior cylindrical surface for said sealing ring carried on the exterior of the same.

9. A stab-type coupling joint as claimed in claim 8 in which said second insert ring is provided with a groove on the end of its frusto-conical surface for receiving a second sealing ring on the exterior of the same, said second sealing ring providing a secondary seal between the exterior of the second insert ring and the interior of said sleeve member from leakage within said sleeve member and further functioning as a primary seal against ingress of fluid from the exterior of said sleeve member.

10. A stab-type coupling joint as claimed in claim 1 in which said second insert ring is provided with a groove on its exterior cylindrical surface for said sealing ring carried on the exterior of the same.

11. A stab-type coupling joint as claimed in claim 10 in which said second insert ring is provided with a groove on the end of its frusto-conical surface for receiving a second sealing ring on the exterior of the same, said second sealing ring providing a secondary seal between the exterior of said second insert ring and the interior of said sleeve member from leakage from within said sleeve member and further functioning as a primary seal against ingress of fluid from the exterior of said sleeve member.

12. A stab-type coupling joint as claimed in claim 1 in which said backup insert ring, said gripper washer, and said rigid annular washer each have an exterior diameter substantially equal to the interior diameter of said cylindrical portion of said sleeve member.

13. A stab-type coupling joint as claimed in claim 12 in which said annular backup insert ring is provided with a frusto-conical recess adjacent said gripper ring to provide a space for fingers of said gripper ring whereby said fingers can flex when the pipe is inserted into said sleeve member.

14. A stab-type coupling joint as claimed in claim 13 in which said second insert ring is provided with a counterbore, said counterbore and said rigid annular washer defining a groove for the sealing ring on the interior surface of said second insert ring and in which said second insert ring is provided with a groove on its exterior cylindrical surface for said sealing ring carried on the exterior of the same.

15. A stab-type coupling joint as claimed in claim 14 in which said second insert ring is provided with a groove on the end of its frusto-conical surface for receiving a second sealing ring on the exterior of the same, said second sealing ring providing a secondary seal between the exterior of said second insert and the interior of said sleeve member from leakage from within said sleeve member and further functioning as a primary seal against the ingress of fluid from the exterior of said sleeve member.

16. A stab-type coupling joint as claimed in claim 1 in which said stop means includes an annular stop ring having a circumscribed outside diameter approximately equal to that of an inside diameter of said sleeve member inwardly of said second frusto-conical portion and a circumscribed inside diameter smaller than the outside diameter of the pipe to be inserted, said stop ring being fixedly secured against axial movement within said sleeve member.

17. A stab-type coupling joint as claimed in claim 16 in which said stop ring is spot-welded to said sleeve member at least at discrete points.

18. A stab-type coupling joint as claimed in claim 16 in which said stop ring has an undulating shape when viewed axially.

19. A stab-type coupling joint as claimed in claim 18 in which said stop ring is split.

20. A stab-type coupling joint as claimed in claim 16 in which said second frusto-conical portion merges at its smaller end with a third frusto-conical portion, said third frusto-conical portion merging at its larger end with a third cylindrical portion, said third cylindrical portion merging with a fourth frusto-conical portion tapering inwardly, said stop ring being positioned between said third and fourth frusto-conical portions whereby the same is restrained from axial movement by the third and fourth frusto-conical portions.

21. A stab-type coupling joint as claimed in claim 20 in which an end portion of said sleeve member opposite the end portion formed by said first frusto-conical portion, said cylindrical portion, and said second frusto-conical portion is a reverse of and substantially identical thereto and wherein pipe gripper means, which are a reverse of and substantially identical to those provided between the first and second frusto-conical portions, are provided in the opposite end portion of said sleeve member so that another pipe may be stabbed from the opposite direction.

22. A stab-type coupling joint as claimed in claim 1 in which said second frusto-conical portion of said sleeve member merges at its smaller end into a second cylindrical portion, said second cylindrical portion at its other end merging into a third frusto-conical portion having an interior diameter at its smaller end less than the exterior diameter of the pipe and thereby functioning as said stop means.

23. A stab-type coupling joint as claimed in claim 22 in which the smaller end of said third frusto-conical portion merges into a cylindrical portion to define the opposite end of said sleeve member, said cylindrical portion being adapted to be welded to the end of another pipe.

* * * * *